United States Patent [19]

Spalding et al.

[11] 4,344,174

[45] Aug. 10, 1982

[54] GAS LASERS

[75] Inventors: Ian J. Spalding, Didcot; Adrian C. Selden, Clifton Hampten; Errico Armandillo, Abingdon, all of England

[73] Assignee: United Kingdom Atomic Energy Authority, London, England

[21] Appl. No.: 182,082

[22] Filed: Aug. 28, 1980

Related U.S. Application Data

[63] Continuation of Ser. No. 16,023, Feb. 23, 1979, abandoned, which is a continuation of Ser. No. 782,842, Mar. 30, 1977, abandoned.

[30] Foreign Application Priority Data

Apr. 2, 1976 [GB] United Kingdom ............... 13508/76

[51] Int. Cl.³ .............................................. H01S 3/09
[52] U.S. Cl. ....................................... 372/91; 372/55; 372/702
[58] Field of Search ................... 331/94.5 G, 94.5 PE

[56] References Cited

U.S. PATENT DOCUMENTS

| | | | |
|---|---|---|---|
| 3,745,482 | 7/1973 | Patel | 331/94.5 G |
| 3,921,098 | 11/1975 | Hoag | 331/94.5 G |
| 4,053,852 | 10/1977 | Krupke | 331/94.5 G |
| 4,063,190 | 12/1977 | Rink | 331/94.5 G |

OTHER PUBLICATIONS

Beterov et al., IEEE J. Quant. Elect., vol. QE-10, No. 2 (Feb. 1974) pp. 245-247.

*Primary Examiner*—William L. Sikes
*Attorney, Agent, or Firm*—Larson and Taylor

[57] ABSTRACT

A laser having a gaseous mixture including carbon dioxide as the lasing medium, wherein the lasing medium is cooled to a temperature such that the thermal population of the lower energy level of an output lasing transition between a higher energy level and a lower energy level of the carbon dioxide molecule is reduced, and the lasing medium is initially energised to create the population inversion which results in the lasting transition at a rate such that significant thermal population of the lower energy level is avoided.

9 Claims, 2 Drawing Figures

GAS LASERS

This is a continuation of application Ser. No. 16,023 filed Feb. 23, 1979 which is a continuation of Ser. No. 782,842 filed Mar. 30, 1977, both now abandoned.

The present invention relates to lasers, and more particularly to transversely-excited electrical discharge gas lasers.

According to the present invention there is provided a laser having a gaseous mixture including carbon dioxide as the lasing medium, wherein the lasing medium is cooled to a temperature such that the thermal population of the lower energy level of an output lasing transition between a higher energy level and a lower energy level of the carbon dioxide molecule is reduced, and the lasing medium is initially energised to create the population inversion which results in the lasing transition at a rate such that significant thermal population of the lower energy level is avoided.

In a preferred form of the invention, the laser utilises a transition between the $02^o0$ and $01^10$ vibrational energy levels of the carbon dioxide molecule as the source of the laser radiation, and the laser medium is a mixture of one or more of the gases hydrogen, helium or argon together with nitrogen and carbon dioxide. The $N_2/CO_2$ ratio is chosen to be $\leq 9$, i.e. it is higher than that conventionally employed in gas lasers using carbon dioxide as the laser medium in order to reduce pumping of the $CO_2$ symmetric and bending modes relative to the antisymmetric $CO_2$, and $N_2$ vibrational modes. The hydrogen, helium and/or argon admixture is chosen to relax the $01^10$ energy level of the carbon dioxide molecule, but the optimum proportion of these gases varies with the total pressure due to collisional coupling between the $01^10$, $10^o0$, $0.2^20$ and $02^o0$ levels, and to practical considerations such as heating effects associated with some types of preionization.

An embodiment of the invention will now be described, by way of example, with reference to the accompanying drawings, in which.

Figure 1:
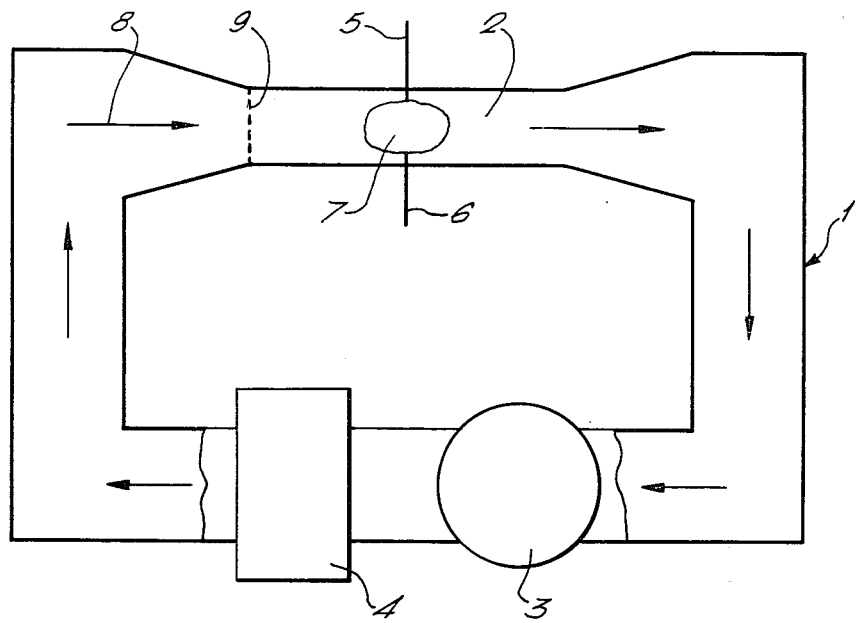
FIG. 1 is a schematic drawing of a gas laser embodying the invention.
Figure 2:
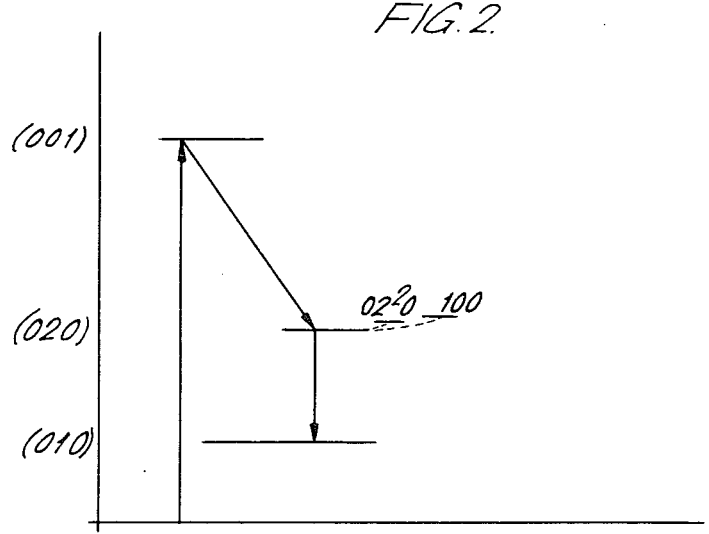
FIG. 2 shows schematically the relevant energy transitions used in the laser of FIG. 1.

Referring to FIG. 1, a transversely excited gas laser employing a mixture of carbon dioxide, nitrogen, and helium (or the other additives) as the lasing medium, consists of a closed system of ducting 1, which includes a region 2 having plane parallel or other suitable surfaces through one of which laser radiation can be extracted. The system of ducting 1 includes a circulating pump 3 and a heat exchanger 4. Anode and cathode electrodes 5 and 6 respectively allow an exciting gaseous discharge 7 to be maintained in the region 2 of the system of ducting 1. The discharge 7, which is maintained transversely to the direction of gas flow 8 in the system of ducting 1 and of the direction of the emitted laser radiation, is the source of the energy used in generating the laser radiation. Upstream of the electrodes 5 and 6 is a baffle 9 which creates uniform turbulent conditions in the lasing medium flowing into the discharge region 2.

The lasing medium is a mixture of carbon dioxide ($C^{12}O^{16}_2$), nitrogen and helium having volumetric proportions of approximately 1:9:10. It is supplied to the discharge region 2 at a pressure of about 0.1–0.6 (absolute) atmospheres and a temperature in the range 140°–230° K. The lasing medium is ionized by passing an auxiliary electron beam having an energy of up to 240 keV through a 0.001" titanium foil for a period of about 10 $\mu$secs to give an energy deposition of some 150–200J/liter atmospheres from the main (pump) capacitors. Neither the foil nor the electron beam is shown in the drawing, but of course, the foil must be situated where the electron beam can provide a suitable ionisation source to control the main discharge. Alternatively, pulsed ultra-violet ionization can be used for the same purpose, with a suitable easily-ionized organic additive such as trimethylamine.

The electrodes 5 and 6 are operated in a suitably timed pulsed mode with a current pulse duration of some tens of microseconds. (This pulse length is sufficiently long to enable the electrical discharge to pump the carbon dioxide (001) and the nitrogen v=1 vibrational energy levels, sufficiently slowly for the subsequent population inversion between the carbon dioxide ($02^o0$) and ($01^10$) vibrational energy levels not to be lost due to the lower energy level becoming populated thermally). Having been energised the carbon dioxide is caused to relax with the almost simultaneous sequential emission of pulses of coherent radiation at wavelengths of 9.4 to 9.6 $\mu$m and 16.2 $\mu$m, resulting from the (vibrational) energy transitions $(00^o1)$–$(02^o0)$ and $(02^o0)$–$(01^10)$ respectively.

The 9.4 to 9.6 $\mu$m pulse may need to be provided by an auxiliary TEA laser, of an intensity sufficient to saturate the $(00^o1)$–$(02^o0)$ transition of the carbon dioxide, and to have a duration in the range of 1 to 300 nanoseconds. This method allows independent control of initial excitation and subsequent inversion on the 16 $\mu$m transition. The 16.2 $\mu$m output pulse then has a small signal gain coefficient $\beta_o \leq 2 \times 10^{-3}$, cm$^{-1}$, and under optimum conditions the overall efficiency is greater than 0.25%. In general, the 9.6 $\mu$m and 16.2 $\mu$m pulses need to have durations $\leq (30/p)$ nanoseconds where p is the total pressure in atmospheres.

The laser is operated in a pulsed mode, both to enable the lasing medium to be pumped relatively weakly, that is to say slowly, to avoid thermal population of the $(01^10)$ vibrational energy level, which would otherwise destroy the necessary population inversion, and so that the transient nature of the 9.6 $\mu$m pulse and the subsequent 16.2 $\mu$m output pulse avoids collisional de-excitation of the population inversions.

The embodiment of the invention described is readily scalable so permitting operation at a wide range of peak and mean powers. Also it can be operated at pressures of at least 1 atmosphere (to give wide-band amplifier operation with low gas consumption). The addition or substitution of other isotopic modifications of carbon dioxide (such as $C^{12}O^{16}O^{18}$, $C^{12}O^{18}_2$ or $C^{13}O^{16}_2$) in general extends the tuning range of the laser; however, chance near-coincidence of absorption from the rotational manifold of the vibrational ground state $(00^o0)$ in particular, and of other low-lying levels in general, must be avoided by a judicious choice of parameters. As an illustrative example, at wavelengths in the neighborhood of the $C^{13}O^{16}_2$ R(13) lasing transition an amplifier operating with a pure $C^{13}O^{16}_2$ constituent should be run at the lowest practicable temperature, at a total pressure $\leq 0.2$ atmospheres, in order to avoid unwanted absorption from the p (26) ground-state $(00^o0$ to $01^10)$ transition. Conversely, at pressures of the order of 1 atmosphere, gain is also available from a few $(02^20)$ to $(01^10)$ transitions due to collisional population of the ($02^20$) level, under favourable kinetic conditions.

As a narrow-band laser oscillator, the system can be efficiently operated on a range of discrete rotation-vibration transitions with several of the isotopic variants of $CO_2$ at pressures typically in the range $10^{-1}$–$10^{-2}$ atmospheres, i.e. at pressures sufficiently low to ensure that the life-time ($\tau$) of the transient inversion is sufficiently long so that oscillation can build up from the level of noise to saturation: to ensure this, the produce $\alpha_o C\tau$ should exceed a factor of about 30, where C is the velocity of light. Chance near-coincidence with absorbing transitions from the ($00^00$) ground state again place an additional upper limit on the total pressure: as illustrative examples the ($02^00$)–($01^10$)$C^{13}O^{16}{}_2 R(13)$ transition can be generated at a total pressure of about $10^{-1}$ atmospheres, but the R(15) and R(17) transitions would require significantly lower pressures.

We claim:

1. A method of operating, in a pulsed mode, a transversely excited gas laser including a carbon dioxide containing lasing medium including the steps of cooling the lasing medium to a temperature such that the thermal population of the lower energy level of an output lasing transition between an upper energy level and a lower energy level of the carbon dioxide molecule is reduced, and, in each pulse, initially exciting the lasing medium to create the population inversion which results in the lasing transition at a rate which is slow enough to ensure that significant thermal population of the lower energy level is avoided during the initial excitation of the lasing medium, the lasing medium being at a pressure such that the product $\alpha_o C\tau$ exceeds a value of approximately 30 where $\alpha_o$ is the small signal gain per centimeter length of the optical length of the laser, C is the velocity of light, and $\tau$ is the lifetime of the transient population immersion which results in the lasing transition.

2. A method according to claim 1 wherein the lasing transition is between the ($02^00$) and ($01^10$) energy levels of the carbon dioxide molecules and the gaseous lasing medium is cooled to a temperature in the range of approximately 140°–230° K.

3. A method according to claim 1 wherein the lasing medium comprises a mixture of carbon dioxide, nitrogen and one or more of the gases hydrogen, helium, and argon and the ratio of nitrogen to carbon dioxide is at least approximately 9 to 1.

4. A method according to claim 3 wherein the lasing medium comprises a mixture of carbon dioxide, nitrogen and helium in volumetric proportions of 1:9:10, respectively.

5. A method according to claim 1 wherein the lasing medium is initially excited by a pulsed electrical discharge, the duration of the pulses of which is of the order of tens of microseconds.

6. A method according to claim 5 wherein the energized medium is irradiated by pulses of radiation having a wavelength in the region of 9.4 to 9.6 m of an intensity sufficient to saturate the ($00^01$)–($02^00$) transition of the carbon dioxide molecule and a duration approximately equal or less than 30/p nanoseconds where p is the total pressure of the lasing medium in atmospheres.

7. A method according to claim 1 wherein the total pressure of the lasing medium is less than one atmosphere.

8. A method according to claim 1 wherein the lasing medium includes molecules which are isotopic variants of natural carbon dioxide.

9. A method according to claim 8 wherein the lasing medium includes molecules of $C^{13}O^{16}{}_2$ and the total gas pressure is less than 0.2 atmospheres.

* * * * *